United States Patent
Kurihara et al.

(10) Patent No.: US 10,807,240 B2
(45) Date of Patent: Oct. 20, 2020

(54) ROBOT CONTROL DEVICE FOR SETTING JOG COORDINATE SYSTEM

(71) Applicant: FANUC CORPORATION, Yamanashi (JP)

(72) Inventors: Yuusuke Kurihara, Yamanashi (JP); Tomoyuki Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 130 days.

(21) Appl. No.: 16/180,358

(22) Filed: Nov. 5, 2018

(65) Prior Publication Data

US 2019/0160671 A1    May 30, 2019

(30) Foreign Application Priority Data

Nov. 24, 2017  (JP) ................. 2017-226117

(51) Int. Cl.
  *B25J 9/16*   (2006.01)
  *B25J 13/08*  (2006.01)
  *B25J 13/06*  (2006.01)

(52) U.S. Cl.
  CPC ............. *B25J 9/1664* (2013.01); *B25J 13/06* (2013.01); *B25J 13/08* (2013.01); *G05B 2219/33004* (2013.01); *G05B 2219/39137* (2013.01); *G05B 2219/50048* (2013.01)

(58) Field of Classification Search
  CPC .......... B25J 9/1664; B25J 13/06; B25J 13/08; G05B 2219/33004; G05B 2219/39137; G05B 2219/50048
  See application file for complete search history.

(56) References Cited

U.S. PATENT DOCUMENTS

| | | | | |
|---|---|---|---|---|
| 5,239,159 A | * | 8/1993 | Masuda | B23K 26/08 219/121.78 |
| 5,687,295 A | * | 11/1997 | Kaihori | B25J 9/1656 700/264 |
| 6,088,628 A | * | 7/2000 | Watanabe | B25J 9/1656 700/251 |
| 9,958,862 B2 | * | 5/2018 | Kapoor | G05B 19/427 |
| 2018/0161984 A1 | * | 6/2018 | Ishige | B25J 19/023 |
| 2018/0161985 A1 | * | 6/2018 | Kobayashi | B25J 9/16 |

(Continued)

FOREIGN PATENT DOCUMENTS

| | | |
|---|---|---|
| CN | 104470687 A | 3/2015 |
| JP | H9-16260 A | 1/1997 |
| JP | H10-291183 A | 11/1998 |

(Continued)

*Primary Examiner* — Nicholas Kiswanto
(74) *Attorney, Agent, or Firm* — Hauptman Ham, LLP (57) ABSTRACT

A robot control device is provided with a display unit for displaying a three-dimensional image of a jog coordinate system and a robot, and an input unit including keys corresponding to coordinate axes of the jog coordinate system. The input unit is formed so that an operator operates an image on the display unit. A display control unit changes the image so that the direction of the jog coordinate system is fixed while the direction of the robot changes in accordance with the operation of the operator in the input unit. When the operator pushes the key, a manual control unit changes the position and orientation of the robot based on the direction of the jog coordinate system with respect to the robot in the image.

3 Claims, 9 Drawing Sheets

(56) References Cited

U.S. PATENT DOCUMENTS

2019/0160671 A1* 5/2019 Kurihara ................. B25J 13/06

FOREIGN PATENT DOCUMENTS

| JP | 2007-334551 A | 12/2007 |
|----|---------------|---------|
| JP | 2011-189431 A | 9/2011 |
| JP | 2013-198956 A | 10/2013 |
| JP | 2014-161921 A | 9/2014 |
| JP | 2016-221643 A | 12/2016 |
| JP | 2017-19068 A | 1/2017 |

* cited by examiner

ROBOT CONTROL DEVICE FOR SETTING JOG COORDINATE SYSTEM

RELATED APPLICATIONS

The present application is claims priority of Japanese Application Number 2017-226117, filed on Nov. 24, 2017, the disclosure of which is hereby incorporated by reference herein in its entirety.

BACKGROUND OF THE INVENTION

1. Field of the Invention

The present invention relates to a robot control device for setting a jog coordinate system.

2. Description of the Related Art

In robot device, a robot control device adapted to manually drive a robot have been known. For example, it is known that the robot control device has a function for automatically driving a robot in accordance with a motion program as well as a function for driving a robot in accordance with an operation by an operator.

The motion program can be generated based on teaching points designated by the operator. The operator can set the teaching points by manually operating the robot. For example, the operator operates a teach pendant so as to put the robot at a desired position and orientation. The position of the tool center point of the robot at this time can be stored as a teaching point in a control device. The control device can generate the motion program based on the teaching points.

Further, some of teach pendants are provided with a display unit for displaying information relating to the drive of a robot. For example, the control in which the trajectory of teaching points of the robot is displayed on the display unit, and the operator changes the trajectory of the robot in an image, have been known (For example, Japanese Unexamined Patent Publication No. 10-291183A).

Further, when teaching points of the robot are set, in addition to operating the teach pendant so as to drive the robot, the operator can change the position and orientation of the robot by grasping an arm of the robot so as to move the arm. Further, the operator can set teaching points corresponding to the desired position and orientation of the robot. When such teaching points are set, the control in which a model of the robot is displayed on the display unit have been known (For example, Japanese Unexamined Patent Publication No. 2017-19068A).

In the setting of the teaching points, it is known that the position and orientation of the robot is changed by pushing keys arranged on the teach pendant. Further, it is known that a jog coordinate system for performing a jog operation is set in order to perform a jog operation (For example, Japanese Unexamined Patent Publication No. 9-16260A).

SUMMARY OF INVENTION

When manually driving a robot, the operator can set a jog coordinate system in an area in which the robot performs an operation. When the jog coordinate system is set, the robot can be driven in the direction corresponding to the coordinate axis by pushing the key of the teach pendant, which correspond to the coordinate axis of the jog coordinate system.

In a method for setting a jog coordinate system, the operator can directly input information of the jog coordinate system into the control device. For example, the operator can set the position of the original point of the jog coordinate system in the reference coordinate system of the robot, and the direction of the jog coordinate system in the reference coordinate system. In this respect, the operator can set the jog coordinate system by inputting coordinate values in the reference coordinate system. Alternatively, as disclosed in Japanese Unexamined Patent Publication No. 9-16260A described above, in the area in which the robot performs an operation, the direction of a coordinate axis of the jog coordinate system can be set by setting the position of two points.

In this way, in order to set the jog coordinate system of the robot, the operator is required to set the information of the jog coordinate system. However, when a jog coordinate system different from the present jog coordinate system is necessary during the period of time in which the robot is manually driven, it is necessary to set the jog coordinate system by the method described above.

Alternatively, a plurality of jog coordinate systems can be stored in a storage unit. During the period of time in which the robot is manually driven, the jog coordinate systems can be switched. However, even in this method, when a jog coordinate system different from the jog coordinate systems stored in advance is necessary, it is necessary to set the jog coordinate system by the method described above. Alternatively, the operator has to use the preset jog coordinate system instead, and accordingly, there is the problem that the operation efficiency is deteriorated.

A robot control device according to an aspect of this disclosure is provided with a display unit for displaying a three-dimensional image including a jog coordinate system and a robot for performing a jog operation, and an input unit including a robot operation part corresponding to coordinate axis of the jog coordinate system. The control device is provided with a display control unit for controlling the image displayed on the display unit, and a manual control unit for detecting an operation of the robot operation part so as to change the position and orientation of the robot in accordance with the operation of the robot operation part. The input unit has an image operation part by which an operator operates the image on the display unit. The display control unit changes the image so that the direction of one of the jog coordinate system and the robot is fixed while the direction of the other changes in accordance with the operation of the operator in the image operation part. When the operator operates the robot operation part, the manual control unit changes the position and orientation of the robot based on the direction of the jog coordinate system with respect to the robot in the image.

DETAILED DESCRIPTION

With reference to FIGS. 1 to 9, a robot control device in an embodiment will be described below. The robot device of present embodiment is formed so that an operator manually controls a robot. The manual control of the robot of the present embodiment includes a control in which the operator grasps a component of the robot such as an arm so as to move the component, and a control operation, in which keys etc. arranged on the operation board of the robot are operated so as to drive the robot. The control device of the present embodiment changes the position and orientation of the robot based on the operation of the operator in operation board.

Figure 1:
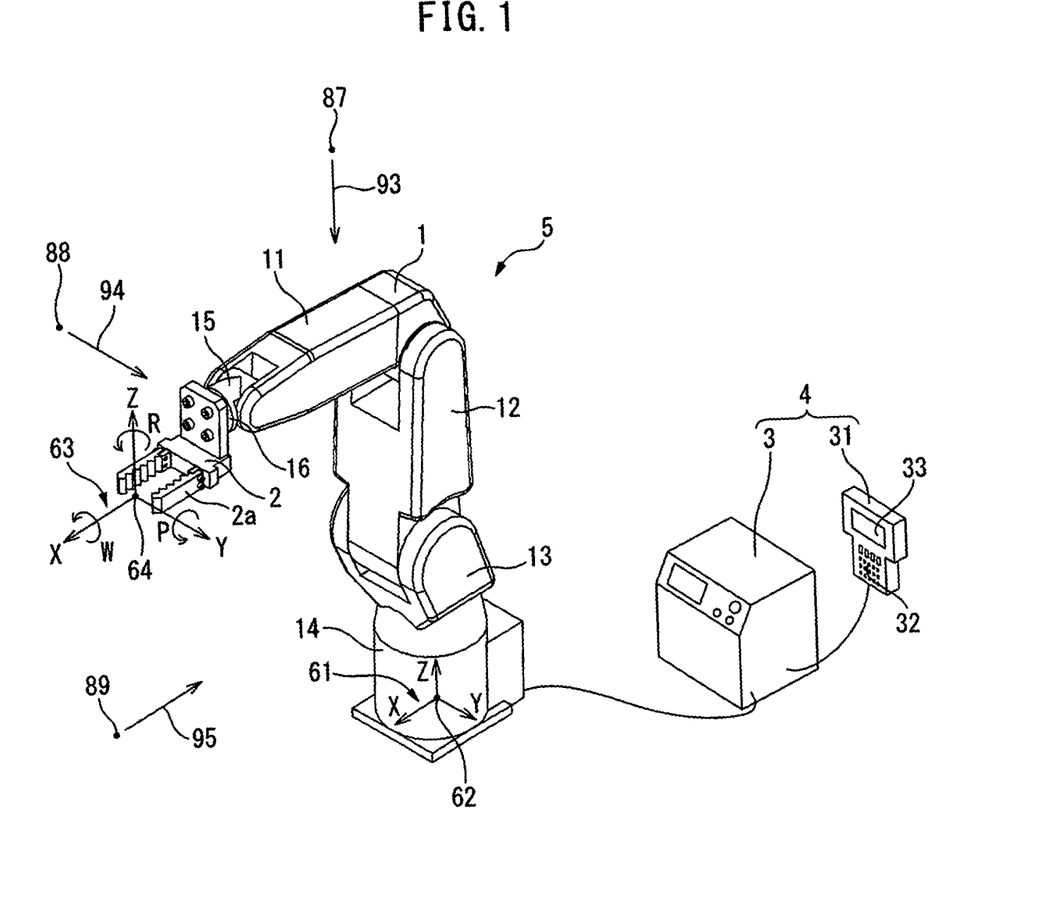
FIG. 1 is a perspective view of a robot device in an embodiment.

FIG. 1 is a schematic perspective view of the robot device in the present embodiment. The robot device 5 is provided with a robot 1 and a hand 2. The robot device 5 is provided with a control device 4 for controlling the robot 1 and the hand 2. The robot 1 of the present embodiment is an articulated robot including a plurality of drive axes. In the articulated robot of the present embodiment, six drive axes are set at the joint parts. In the joint parts, the directions of the arm and a wrist are changed around the drive axes.

The hand 2 is an operation tool for grasping or releasing a workpiece. The operation tool is also referred to as "end effector". The hand 2 is formed so as to open or close fingers 2a. The operation tool is not limited to the hand 2, and any operation tool that corresponds to an operation performed by the robot device 5 can be adopted. For example, an operation tool for arc welding or an operation tool for arranging a sealing material on the surface of the workpiece can be adopted.

The robot 1 of the present embodiment includes an upper arm 11 and a lower arm 12. The lower arm 12 is supported by a swivel base 13. The swivel base 13 is supported by a base 14. The wrist 15 is coupled to an end part of the upper arm 11. The wrist 15 includes a flange 16 to which the hand 2 is secured. These components of the robot 1 are formed so as to rotate around the predetermined drive axes.

The control device 4 includes a main body 3 including a computer for controlling the robot 1. The main body 3 is connected to the robot 1. The control device 4 is provided with a teach pendant 31 connected to the main body 3 via a communication device. The teach pendant 31 performs an operation for the main body 3, or displays information.

Figure 2:
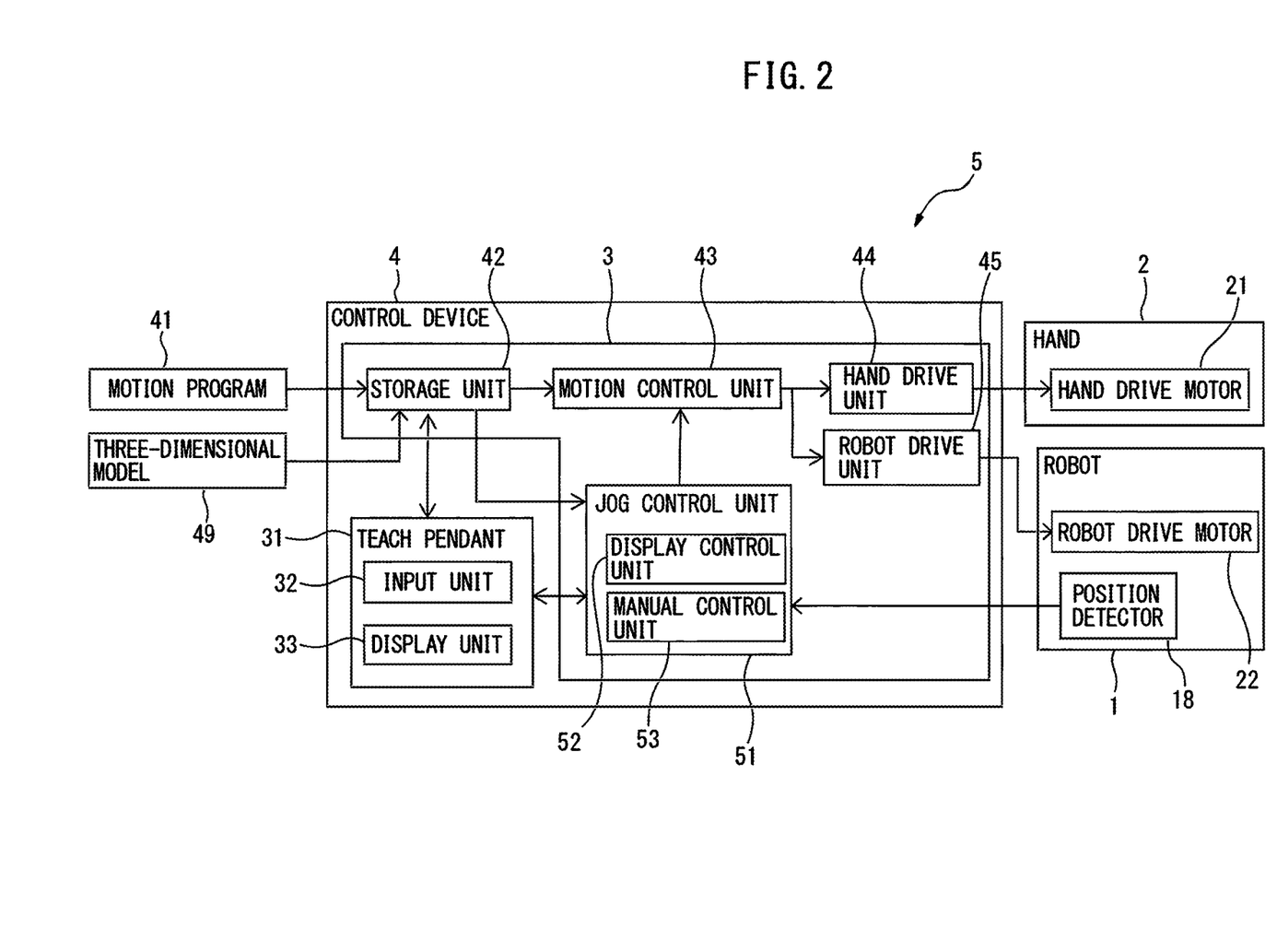
FIG. 2 is a block diagram of the robot device in the embodiment.

FIG. 2 is a block diagram of the robot device in the present embodiment. With reference to FIGS. 1 and 2, the robot 1 includes a robot drive device for changing the position and orientation of the robot 1. The robot drive device includes robot drive motors 22 for driving the components such as the arm and the wrist. In the present embodiment, one robot drive motor 22 is arranged per one drive axis.

The robot device 5 is provided with a hand drive device for driving the hand 2. The hand drive device includes a hand drive motor 21 for driving the fingers 2a of the hand 2. The hand drive motor 21 causes the fingers 2a of the hand 2 to open or close.

The robot 1 of the present embodiment is formed so as to be driven based on a predetermined motion program 41. The robot 1 can automatically transfer a workpiece from an initial position to a target position based on the motion program 41.

The main body 3 of the control device 4 includes an arithmetic processing unit (computer) having a CPU (Central Processing Unit), and a RAM (Random Access Memory) and a ROM (Read Only Memory) which are connected to the CPU via a bus. The control device 4 includes a storage unit 42 for storing information relating to the control of the robot 1. The motion program 41 is stored in the storage unit 42. A motion control unit 43 transmits a motion command for driving the robot 1 to a robot drive unit 45 based on the motion program 41. The robot drive unit 45 includes an electric circuit for driving the robot drive motor 22. The robot drive unit 45 supplies electricity to the robot drive motor 22 based on a motion command. The position and orientation of the robot 1 are changed by driving the robot drive motor 22.

Further, the motion control unit 43 transmits a motion command for driving the hand 2 to a hand drive unit 44 based on the motion program 41. The hand drive unit 44 includes an electric circuit for driving the hand drive motor 21. The hand drive unit 44 supplies electricity to the hand drive motor 21 based on a motion command. The hand drive motor 21 is driven so as to activate the fingers 2a of the hand 2. The hand 2 can grasp or release the workpiece.

The robot 1 includes a state detector for detecting the position and orientation of the robot 1. The state detector of the present embodiment includes a position detector 18 attached to the robot drive motor 22. The direction of the component in each drive axis can be obtained from the output of the position detector 18. For example, the position detector 18 can detect a rotation angle when the robot drive motor 22 is driven.

Figure 3:
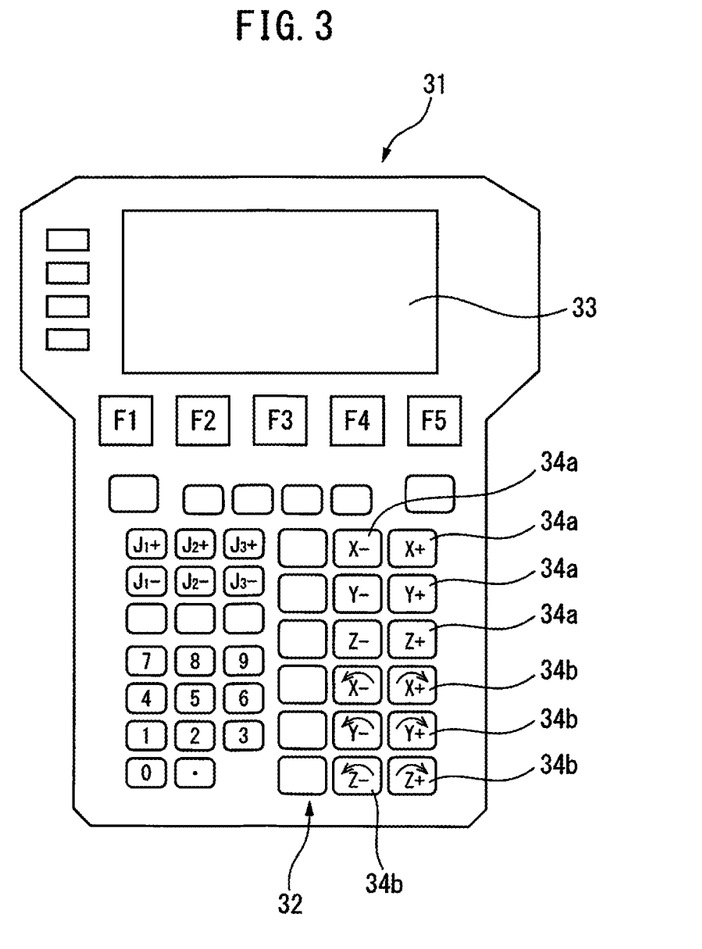
FIG. 3 is a schematic plan view of a teach pendant in the embodiment.

FIG. 3 is a schematic plan view of the teach pendant in the present embodiment. With reference to FIGS. 1 to 3, the teach pendant 31 includes an input unit 32 for inputting information relating to the robot 1. The operator can input desired information by operating the input unit 32. The input unit 32 includes a plurality of keys 34a, 34b which correspond to the coordinate axes of the predetermined coordinate system. The keys 34a, 34b function as robot operation parts for manually operating the robot. The teach pendant 31 includes a display unit 33 for displaying information relating to the robot 1.

In the display unit 33 of the present embodiment, a touch panel-type display is adopted. The operator can push or swipe the screen of the display unit 33 so as to input information. The display unit 33 of the present embodiment is formed so that the operator can operate an image displayed on the display unit 33. Thus, the display unit 33 of the present embodiment has a function for displaying an image as well as a function of the input unit for inputting information.

In the robot device 5, a reference coordinate system 61 that does not move when the position and orientation of the robot 1 are changed is set. In an example shown in FIG. 1, in the base 14 of the robot 1, an original point 62 of the reference coordinate system 61 is disposed. The reference coordinate system 61 is also referred to as "world coordinate system". In the reference coordinate system 61, the position of the original point 62 is fixed, and the directions of the coordinate axes are fixed. The reference coordinate system 61 has, as coordinate axes, an X-axis, a Y-axis, and a Z-axis, which are perpendicular to one another. Further, a W-axis is set as a coordinate axis around the X-axis. A P-axis is set as a coordinate axis around the Y-axis. An R-axis is set as a coordinate axis around the Z-axis. Further, the coordinate values ($x_b$, $y_b$, $z_b$, $w_b$, $p_b$, $r_b$) of the reference coordinate system 61 can be set.

The control device 4 of the present embodiment is formed so that the operator operates the robot operation parts so as to change the position and orientation of the robot 1. The control device 4 is formed so as to manually change the position and orientation of the robot 1. The operator pushes the keys 34a, 34b arranged on the input unit 32 so as to change the position and orientation of the robot 1 based on the predetermined coordinate system. In the present embodiment, these operations are referred to as "jog operation". Further, the keys for performing the jog operation are also referred to as "jog keys". Note that the robot operation parts are not limited to keys, and any configuration for manually driving the robot can be adopted.

In the present embodiment, a jog coordinate system 63 for performing a jog operation of the robot 1 is set. The original point 64 of the jog coordinate system 63 can be set at any position by the operator. For example, the original point 64 can be set at the position of the tool center point of the operation tool. In the example shown in FIG. 1, the original point 64 is set at the tool center point of the hand 2.

The jog coordinate system 63 has an X-axis, a Y-axis, and a Z-axis, which are perpendicular to one another. The jog coordinate system 63 has a W-axis around the X-axis, a P-axis around the Y-axis, and an R-axis around the Z-axis. Thus, the jog coordinate system 63 has a plurality of coordinate axes.

The jog coordinate system 63 is a coordinate system in which the position of the original point 64 in the robot 1 or the hand 2 is not changed when the position and orientation of the robot 1 are changed. In the example shown in FIG. 1, when the position of the flange 16 is changed, the position of the original point 64 is changed. Thus, the position of the original point 64 of the jog coordinate system 63 changes in accordance with a change in the position and orientation of the robot 1. On the other hand, the direction of the jog coordinate system 63 is not changed even when the position and orientation of the robot 1 are changed. In other words, the direction in which the X-axis extends, the direction in which the Y-axis extends, and the direction in which the Z-axis extends are not changed when the position and orientation of the robot 1 are changed. The direction of the jog coordinate system 63 is constant with respect to the direction of the reference coordinate system 61.

Such a jog coordinate system 63 can be calculated by converting the reference coordinate system 61. For example, the position of the original point 64 is set at the coordinate value of the X-axis, the coordinate value of the Y-axis, and the coordinate value of the Z-axis in the reference coordinate system 61, based on the position and orientation of the robot 1. Further, the direction of the jog coordinate system 63 can be set at the coordinate value of the W-axis, the coordinate value of the P-axis, and the coordinate value of the R-axis in the reference coordinate system 61.

The keys 34a arranged on the input unit 32 of the teach pendant 31 are buttons for linearly moving the original point 64 in the direction in the X-axis, the Y-axis, and the Z-axis of the jog coordinate system. The operator changes the position and orientation of the robot 1 by pushing the key 34a so that the original point 64 moves along the coordinate axis included in the jog coordinate system 63. For example, when the operator pushes the key 34a of "X+", the position and orientation of the robot 1 change so that the original point 64 moves to the positive side of the X-axis.

Further, the keys 34b are buttons for driving the robot 1 so that the hand 2 or the robot 1 rotates in the direction in the W-axis around the X-axis, the P-axis around the Y-axis, and the R-axis around the Z-axis. The operator changes the position and orientation of the robot 1 by pushing the key 34b so that the flange 16 of the hand 2 or the robot 1 rotates around the coordinate axis passing through the original point 64. For example, when the operator pushes the key 34b of "X+", the position and orientation of the robot 1 change so that the hand 2 rotates toward the positive side about a rotation axis, i.e., the X-axis extending from the original point 64.

In the jog operation, during the period of time in which the operator pushes the keys 34a, 34b, the position and orientation of the robot 1 change. Alternatively, the movement amount per pushing operation of each key may be previously determined. Further, in the above embodiment, mechanical keys 34a, 34b are arranged on the teach pendant 31, but the embodiment is not limited to this. The keys may be displayed on the display unit 33. The operator may change the position and orientation of the robot 1 by pushing the key displayed on the display unit 33.

The position and orientation of the robot 1 can be adjusted easily by performing the jog operation using the jog coordinate system 63. For example, the direction toward a workpiece placed on the bench can be set at the positive direction of the X-axis in the jog coordinate system. The operator can move the tool center point corresponding to the original point 64 in the direction toward the workpiece by pushing the key 34a of the positive side of the X-axis in the input unit 32. Thus, when the robot 1 is manually driven, the robot 1 can be changed to a desired position and orientation in a short period of time. As a result, the efficiency of an operation for setting teaching points in the robot 1 is improved.

With reference to FIG. 2, the main body 3 of the control device 4 of the present embodiment includes a jog control unit 51 for controlling the jog operation. The jog control unit 51 includes a display control unit 52 for controlling an image displayed on the display unit 33. The jog control unit 51 includes a manual control unit 53 for changing the position and orientation of the robot 1 based on the direction of the jog coordinate system 63 with respect to the robot 1 in the image displayed on the display unit 33.

Figure 4:
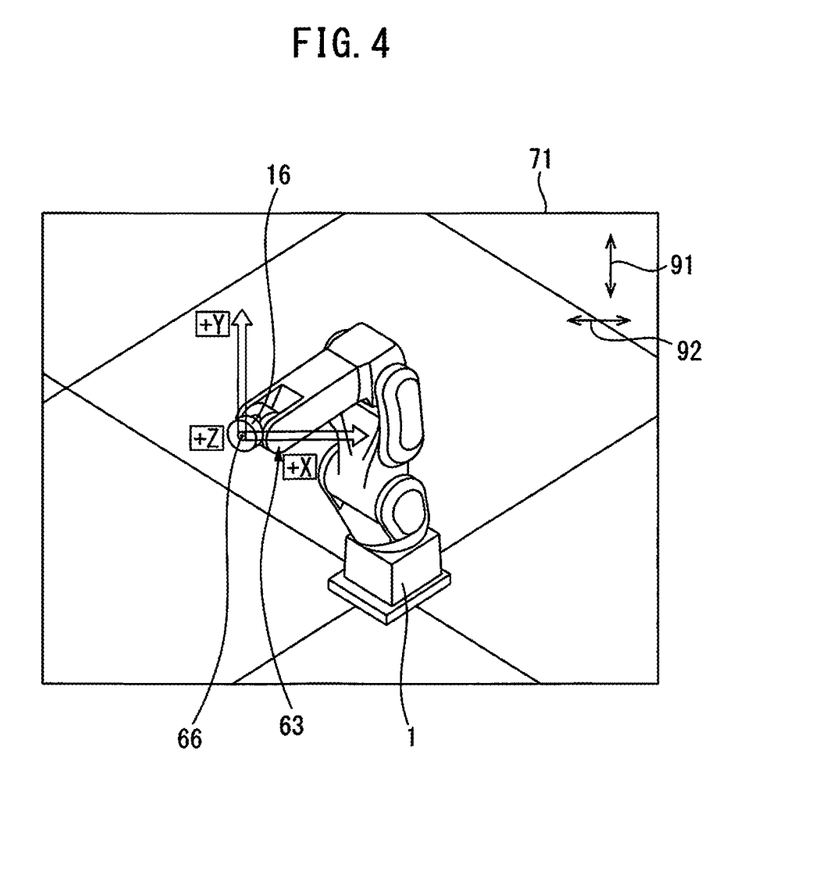
FIG. 4 is a first image of the robot displayed on a display unit of the teach pendant.

FIG. 4 shows a first image displayed on the display unit of the teach pendant in the present embodiment. The display control unit 52 of the present embodiment is formed so as to display an image 71 of the robot 1 and the jog coordinate system 63 on the display unit 33. In the present embodiment, the display unit 33 displays, in three dimensions, an image including the robot 1 and the jog coordinate system 63. Note that the image displayed on the display unit 33 may include an object other than the robot 1 and the jog coordinate system 63.

With reference to FIGS. 2 and 4, the operator previously inputs a three-dimensional model 49 of the robot 1 and the hand 2 to the control device 4. As the three-dimensional model 49, for example, three-dimensional data generated in a CAD (Computer Aided Design) device can be used. The three-dimensional data of the robot include shape data of the components of the robot 1. The data for displaying three-dimensional data on the display unit are not limited to the three-dimensional model, and any data can be adopted. For example, the three-dimensional model can be made in the control device by using two-dimensional drawing data formed by the CAD device.

The display control unit 52 displays the robot 1 on the display unit 33 based on the three-dimensional model 49. The display control unit 52 calculates the position and orientation of the robot 1 based on the output of the position detector 18. The display control unit 52 displays the image of the robot 1 at the present position and orientation on the display unit 33. In accordance with a change in the actual position and orientation of the robot 1, the position and orientation of the robot 1 in the image 71 change.

Further, the display control unit 52 displays the jog coordinate system 63 in three dimensions. The initial position and the initial direction of the jog coordinate system 63 are previously determined. When the operator selects a jog operation in the teach pendant 31, the jog coordinate system 63 is displayed in the image 71 at the initial position and the initial direction. In the present embodiment, the jog coordinate system 63 is displayed so that the X-axis and the Y-axis are arranged in parallel with the frame of the display unit 33, and the Z-axis is arranged in a direction perpendicular to the screen of the display unit 33.

As described above, the position of the original point 64 of the actual jog coordinate system 63 is previously determined. In the present embodiment, the original point 64 is disposed at the tool center point. On the other hand, in the image 71, an original point 66 of the jog coordinate system 63 can be disposed at any position. In other words, within the image 71, the jog coordinate system 63 can be displayed at any position. In the example shown in FIG. 4, on the surface of the flange 16 of the robot 1, the original point 66 is disposed at the center of rotation of the flange 16. When the operator operates the teach pendant 31, the robot 1 is driven based on the position of the original point 64 of the actual jog coordinate system 63, regardless of the position of the original point 66 of the jog coordinate system 63 in the image 71.

The input unit 32 of the control device 4 has an image operation part by which the operator operates the image displayed on the display unit 33. In the present embodiment, a touch panel-type display unit 33 has a function of the input unit. The display unit 33 is formed so that the operator can operate the image by contacting with the surface of the display unit 33. Thus, the display unit 33 of the present embodiment functions as the image operation part.

The control device 4 is formed so that the operator can change the direction of the jog coordinate system 63 with respect to the robot 1 in the image 71 by operating the display unit 33. The display control unit 52 of the present embodiment displays an image of the robot 1 viewed from a certain view point which rotates about a predetermined point in accordance with the operation of the operator. For example, the center of rotation can be disposed within an area in which the robot 1 is disposed so that the view point moves around the robot 1.

The operator can cause the display control unit 52 to change the direction of the robot 1 in the image 71 by swiping the surface of the display unit 33 with a finger. Alternatively, the display control unit 52 can change the position of the view point for viewing the robot 1. The original point 66 of the jog coordinate system 63 in the image 71 moves in accordance with the movement of the previously fixed position. On the other hand, the direction of the jog coordinate system 63 in the image 71 is unchanged and constant. Thus, the direction of the jog coordinate system 63 in the image 71 is fixed. The jog control unit 51 of the present embodiment calculates the position of the jog coordinate system 63 and the direction with respect to the robot 1, so that the apparent direction of the jog coordinate system 63 in the image is fixed according to the rotation of the image of the robot 1. The display control unit 52 displays the image of the jog coordinate system 63 based on the calculation result.

For example, the operator can rotate the view point in the height direction by swiping the surface of the display unit 33 in the direction designated by arrow 91. Further, the operator can rotate the view point in the horizontal direction by swiping the surface of the display unit 33 in the direction designated by arrow 92. Thus, the position (view point) from which the robot 1 is viewed can be arbitrarily adjusted.

Figure 5:
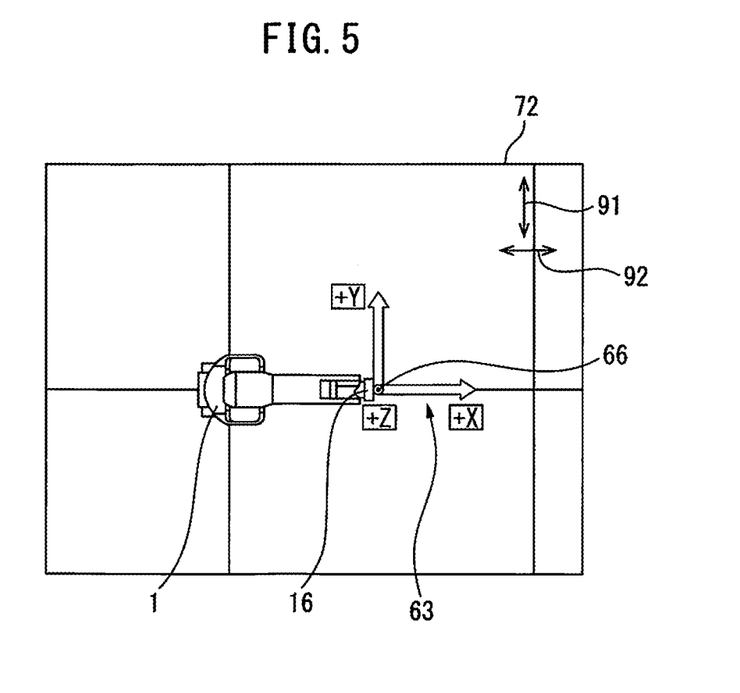
FIG. 5 is a second image of the robot displayed on the display unit of the teach pendant.

FIG. 5 shows a second image of the robot and the jog coordinate system. The second image 72 is an image that is obtained when the operator operates the image so as to change the position of the view point so that the robot 1 is viewed from above. In the second image 72, as designated by arrow 93 in FIG. 1, the robot 1 is viewed from a view point 87 directly above the robot 1.

Figure 6:
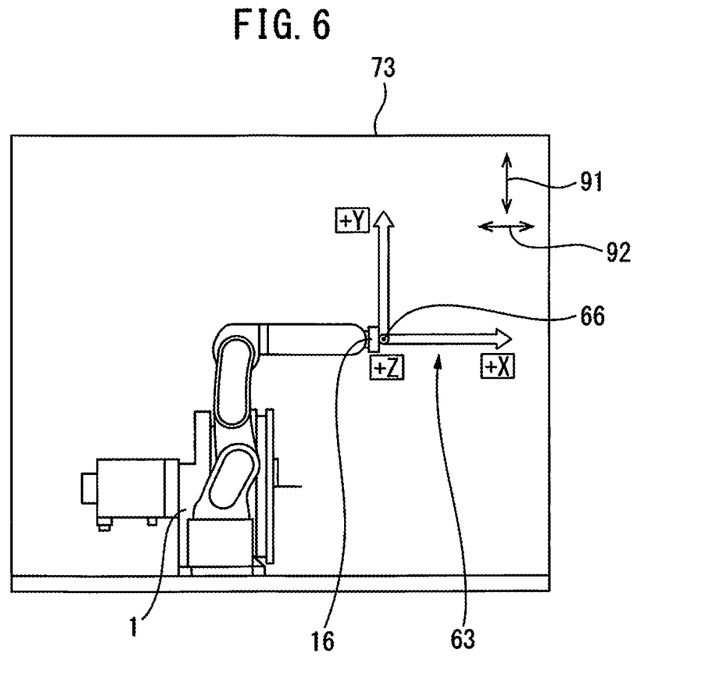
FIG. 6 is a third image of the robot displayed on the display unit of the teach pendant.

FIG. 6 shows a third image of the robot and the jog coordinate system. The third image 73 is an image that is obtained when the operator changes the image of the robot 1 by swiping with the finger in the direction designated by arrow 91 in the image 72 in FIG. 5. In the image 73, the direction of the robot 1 rotates around the X-axis of the jog coordinate system 63 in the image 72. The third image 73 is an image that is obtained when the robot 1 is viewed from a view point 88 disposed on the side of the robot 1 as designated by arrow 94 in FIG. 1.

Figure 7:
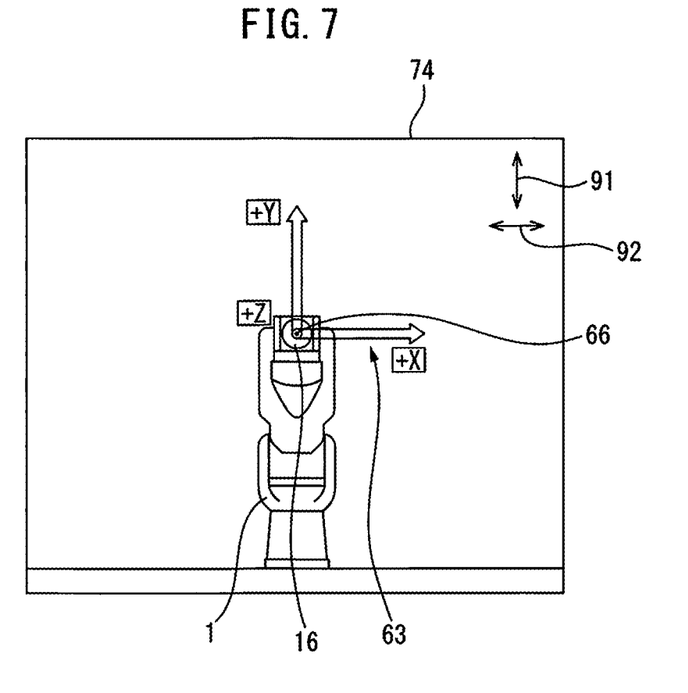
FIG. 7 is a fourth image of the robot displayed on the display unit of the teach pendant.

FIG. 7 shows a fourth image of the robot and the jog coordinate system. The fourth image 74 is an image that is obtained when the operator moves the image of the robot 1 by swiping with the finger in the direction designated by arrow 92 in the image 73 in FIG. 6. The operator operates the image so as to change the view point, so that the robot 1 is viewed from the front. The direction of the robot 1 is changed to the direction around the Y-axis in the image of robot 1 in FIG. 6. The fourth image 74 is an image that is obtained when the robot 1 is viewed from the view point 89 disposed on the front side of the robot 1 as designated by arrow 95 in FIG. 1.

With reference to FIGS. 4 to 7, the operator operates the image displayed on the display unit 33, so that the direction of the robot 1 is changed to an arbitrary direction. However, the direction of the jog coordinate system 63 in the images 71, 72, 73, 74 is always constant. In other words, the X-axis extends to the right side of the image, the Y-axis extends to the upper side, and the Z-axis extends to the front side of the image.

In this way, the display control unit 52 changes the image so that the direction of the robot 1 is changed while the direction of the jog coordinate system 63 is fixed. In the present embodiment, the position of the view point from which the robot 1 is viewed is changed. As a result, the direction of the jog coordinate system 63 with respect to the robot 1 is changed.

With reference to FIGS. 2 and 3, the jog control unit 51 includes the manual control unit 53 for changing the position and orientation of the robot 1 based on the direction of the jog coordinate system 63 with respect to the robot 1 in the image displayed on the display unit 33. The direction in which the coordinate axis of the jog coordinate system extends, with respect to the robot 1 in the presently displayed image corresponds to the direction in which the robot 1 is actually driven.

The operator selects a jog operation based on the jog coordinate system by using the input unit 32. The manual control unit 53 detects the operation of the keys 34a, 34b by the operator. In other words, the manual control unit 53 detects any of the keys 34a, 34b of the input unit 32, which has been pushed.

The manual control unit 53 selects a drive axis in which the robot 1 is driven and calculates the drive amount in the drive axis based on the operator's operation of the keys 34a, 34b and the image displayed on the display unit 33. For example, in the case of the robot 1 having six axes, the manual control unit 53 selects one or more drive axes, and calculates the drive amount in each drive axis. The manual control unit 53 transmits a motion command for the selected drive axis and the drive amount to the motion control unit 43. The motion control unit 43 drives the robot drive device based on the received motion command. As a result, the position and orientation of the robot 1 are changed.

The manual control unit 53 controls the position and orientation of the robot 1 so as to drive the robot 1 in the direction corresponding to the pushed key. In other words, the manual control unit 53 changes the position and orientation of the robot 1 so as to move the original point 64 of the jog coordinate system 63 in the direction of the coordinate axis corresponding to the key 34a. Further, the manual control unit 53 controls the position and orientation of the robot 1 so that the hand 2 or the robot 1 rotates in the direction of the coordinate axis corresponding to the key 34b. For example, when the operator pushes the key 34a of "X+" of the input unit 32, the manual control unit 53 changes the position and orientation of the robot 1 so that the original point 64 of the jog coordinate system 63 moves in the positive direction in the X-axis displayed on the display unit 33. Further, the display control unit 52 changes the image of the robot 1 into the present position and orientation of the robot 1 based on the output of the position detector 18.

Figure 8:
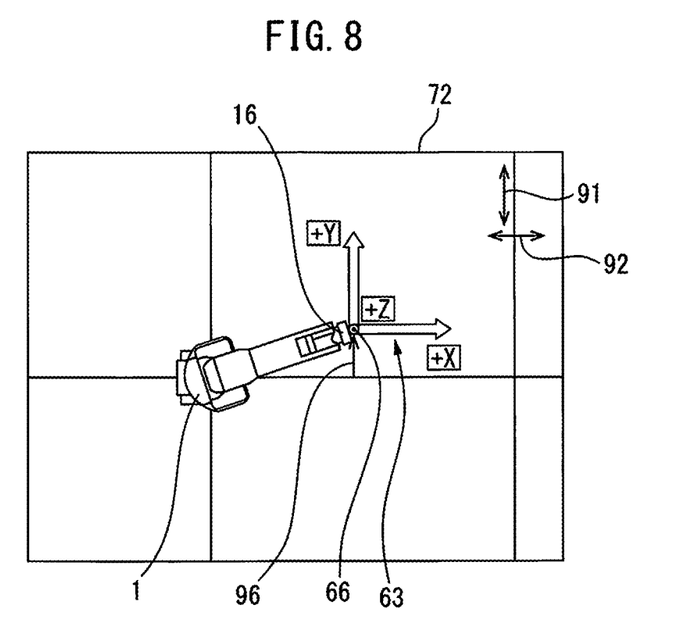
FIG. 8 is a fifth image of the robot displayed on the display unit of the teach pendant.

FIG. 8 shows a fifth image of the robot and the jog coordinate system. FIG. 8 shows a state after the operator pushes the key 34a of "Y+" in the state shown in FIG. 5. The position of the original point 66 of the jog coordinate system 63 moves to the positive side of the Y-axis as designated by arrow 96. The image of the robot 1 changes in accordance with a change in the position and orientation of the robot 1. Further, the direction of the jog coordinate system 63 in the image 72 is constant.

The operator performs the jog operation, whereby the image in the display unit 33 can be changed in accordance with the actual position and orientation of the robot 1. Further, the operator can change the position and orientation of the robot 1 by pushing desired keys 34a, 34b. Alternatively, the operator can change the direction of the jog coordinate system 63 with respect to the robot 1 by swiping the screen of the display unit 33. Further, the desired keys 34a, 34b are pushed, so that the position and orientation of the robot 1 can be changed based on the direction of the jog coordinate system 63 displayed on the display unit 33. Thus, the operator can perform the jog operation while changing the direction of the jog coordinate system. Note that, when the operator finishes the jog operation, the direction of the jog coordinate system 63 with respect to the robot 1 can be returned to the initial direction.

Figure 9:
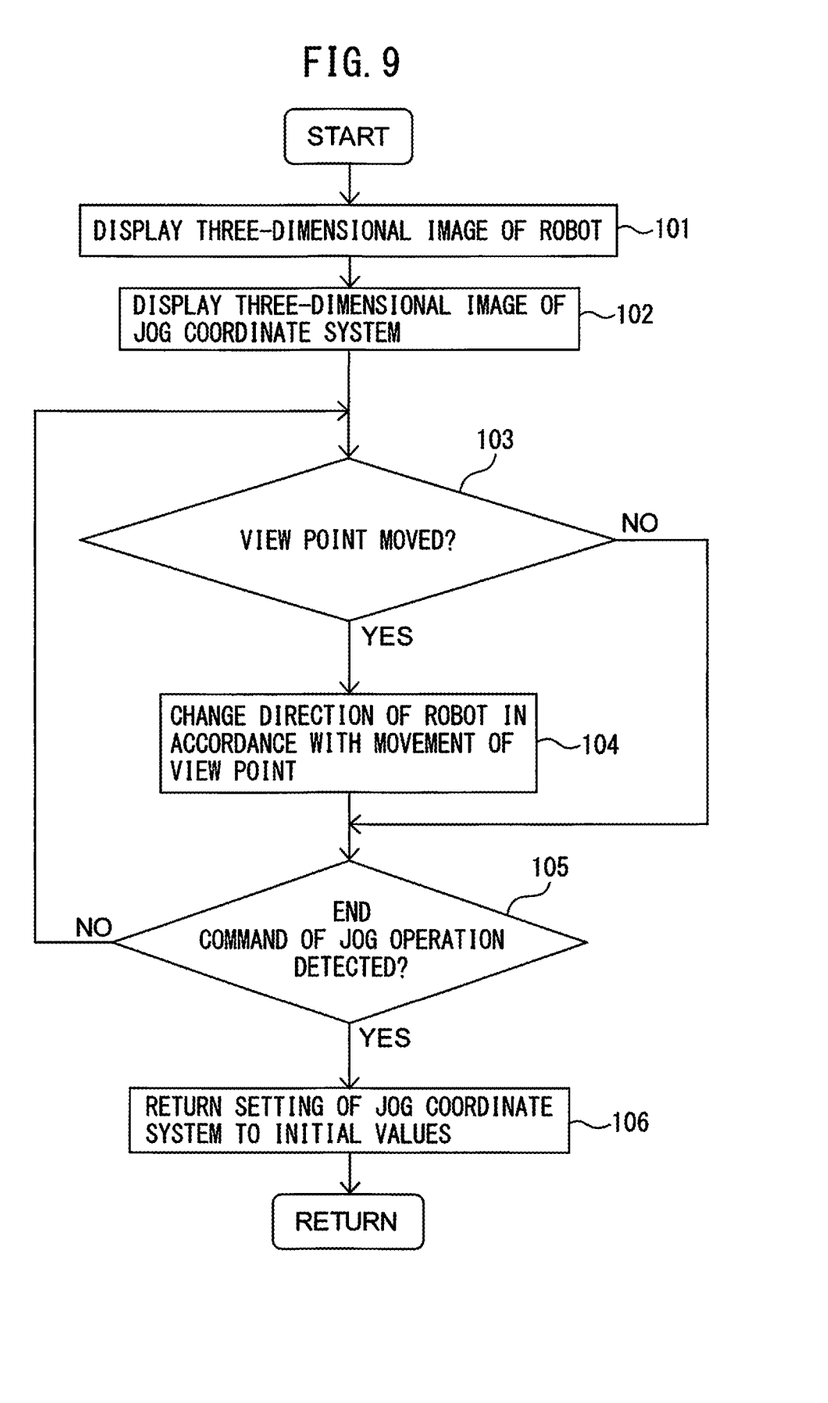
FIG. 9 is a flowchart for controlling the image displayed on the display unit of the teach pendant.

FIG. 9 is a flowchart of the control of the image of the display unit in the present embodiment. With reference to FIGS. 2 and 9, the operator selects the jog operation based on the jog coordinate system 63 in the teach pendant 31. For example, the operator pushes a key for selecting the jog operation. The jog control unit 51 detects a signal indicating that the jog operation based on the jog coordinate system has been selected.

At step 101, the display control unit 52 displays a three-dimensional image of the robot 1 on the display unit 33. At step 102, the display control unit 52 displays the three-dimensional image of the jog coordinate system 63 along with the image of the robot 1 on the display unit 33. The display control unit 52 displays the images of the robot 1 and the jog coordinate system 63 based on the predetermined initial position and initial direction of the jog coordinate system 63 with respect to the robot 1.

Subsequently, at step 103, the display control unit 52 determines whether or not the view point is moved by the operation of the operator. In other words, it is determined whether or not the operator changes the direction of the robot 1 in the image by operating the image. At step 103, when the operator does not move the view point, the control is shifted to step 105. At step 103, when the operator moves the view point, the control is shifted to step 104.

At step 104, the display control unit 52 changes the direction of the robot 1 in the image in accordance with the movement of the view point. In this respect, the display control unit 52 performs a control operation so as not to change the direction of the jog coordinate system 63 in the image.

Subsequently, at step 105, the display control unit 52 determines whether or not an end command of the jog operation is detected. In other words, it is determined whether or not the operator cancels the selection of the jog operation based on the jog coordinate. At step 105, when the end command of the jog operation is not detected, the control is returned to step 103. Further, the operations in step 103 and step 104 are repeated, so that the orientation of the image of the robot 1 is changed. Further, the operator pushes the keys 34a, 34b of the input unit 32 during the period of time in which the operations from step 103 to step 105 are performed, so that the robot 1 can be driven based on the orientation of the jog coordinate system 63 displayed on the image.

At step 105, when the end command of the jog operation is detected, the control is shifted to step 106. At step 106, the display control unit 52 returns the setting of the jog coordinate system 63 to initial values. The display control unit 52 returns the direction of the jog coordinate system 63 with respect to the robot 1 to the initial direction.

In this way, the operator can easily change the direction of the coordinate axes of the jog coordinate system 63 with respect to the robot 1 by operating the image of the display unit 33. Particularly, during the period of time in which the robot 1 is manually operated, the direction of the jog coordinate system 63 can be changed. Thus, the jog coordinate system can be easily set. Further, the operator can set a new jog coordinate system for a short period of time. Thus, the operation efficiency for manually operating the robot is improved. Further, the jog coordinate system can be set based on the image of the robot and the jog coordinate system, so that failure in setting the jog coordinate system can be prevented.

Further, the display control unit 52 rotates the position of the view point in accordance with the operation of the operator. The display control unit 52 displays the image obtained when the robot 1 is viewed from this view point. When the view point moves, the direction of the jog coordinate system 63 with respect to the robot 1 is changed, whereby the operator can easily change the direction of the jog coordinate system 63 with respect to the robot 1.

In the above first image to fourth image, the position of the original point 66 of the jog coordinate system 63 in the image moves in conjunction with the movement of the view point. In other words, the original point 64 is disposed on the surface of the flange 16 of the wrist 15 of the robot 1, but the embodiment is not limited to this. In the image, the position of the original point 64 may be fixed. For example, the jog coordinate system may always be displayed on the lower left of the image. Even in this case, the position and orientation of the robot 1 are changed based on the position of the original point 64 of the jog coordinate system 63 which has been set in the actual robot 1.

In the above embodiment, the operator can change the direction of the image of the robot 1 by swiping the surface of the display unit 33, but the embodiment is not limited to this. Any operation of the image operation part enables the direction of the image of the robot to be changed. For example, keys can be arranged as the image operation part in the input unit. The direction of the image may be changed in accordance with the operation of each key.

In the above embodiment, the display control unit 52 displays the image so that the view point rotates about a predetermined point as a center, around the robot 1, but the embodiment is not limited to this. The display control unit 52 can performs any operation of the view point. For example, the display control unit 52 may linearly move the view point for the robot. Alternatively, the display control unit 52 may increase or decrease the size of the image of the robot 1 in accordance with the operation of the operator in the input unit 32.

In the above embodiment, the setting of the jog coordinate system 63 is returned to initial values every time the jog operation ends, but the embodiment is not limited to this. The jog coordinate system 63 which has been set when the jog operation ends or during the period of time in which the jog operation is performed may be stored in the storage unit 42. The operator can select the jog coordinate system which has been stored in the storage unit 42 when the jog operation starts or during the period of time in which the jog operation is performed. The display control unit 52 can acquire the jog coordinate system 63 which has been stored in the storage unit 42 and can display the same on the display unit 33. By adopting this control, any jog coordinate system 63 can be stored, and the orientation of the jog coordinate system 63 with respect to the robot 1 can be easily set even though the image of the display unit 33 is not operated. For example, the setting of the jog coordinate system 63 which is often used is stored, whereby the jog coordinate system 63 can quickly be set and the operation efficiency is improved.

Further, in the above embodiment, the display control unit 52 controls the image so that the direction of the robot 1 in the image changes in accordance with the operation of the operator in the image operation part, and the direction of the jog coordinate system is fixed, but the embodiment is not limited to this. The display control unit may control the image so that the direction of the robot does not change in accordance with the operation of the operator in the image operation part, and the direction of the jog coordinate system is changed. Even in this respect, when the operator pushes the key of the input unit, the manual control unit can drive the robot based on the direction of the jog coordinate system with respect to the robot in the presently displayed image. Thus, the display control unit can change the image so that the direction of one of the jog coordinate system and the robot is fixed while the direction of the other changes in accordance with the operation of the operator in the input unit.

The operation for manually driving the robot 1 is not limited to the operation for setting teaching points. The robot 1 can be manually operated for any purposes. For example, when a workpiece is transferred around the robot, the upper arm of the robot may be an obstacle. In this respect, the position and orientation of the robot can temporarily be changed so that the direction of the upper arm is changed.

In the above embodiment, the display unit 33 and the input unit 32 are arranged on the teach pendant 31, but the embodiment is not limited to this. At least one of the display unit 33 and the input unit 32 may be arranged on a device that is different from the teach pendant 31. Further, the device on which the display unit and the input unit are arranged is not limited to the teach pendant that is dedicated to the robot, and may be any device which is provided with the display unit and the input unit for performing the jog operation of the robot. For example, a portable computer such as a tablet may have the functions of the display unit and the input unit of the present embodiment.

The robot control device according to an aspect of this disclosure can easily change the jog coordinate system.

In each of the above-mentioned control operations, the order of steps can be appropriately changed within a range in which the functions and actions are not changed. The above embodiments can be appropriately combined with each other. In each of the above-mentioned figures, the same reference numerals are given to the same or similar elements. It should be noted that the above embodiments are merely examples and do not limit the invention. Further, in the embodiments, modifications of the embodiments indicated in the claims are included.

The invention claimed is:

1. A robot control device comprising:
a display unit for displaying a three-dimensional image including a jog coordinate system for performing a jog operation and a robot;
an input unit including a robot operation part corresponding to coordinate axis of the jog coordinate system;
a display control unit for controlling the image displayed on the display unit; and
a manual control unit for detecting an operation of the robot operation part so as to change position and orientation of the robot in accordance with the operation of the robot operation part, wherein
the robot is an articulated robot including a plurality of drive axes,
an original point of the jog coordinate system is fixed at a predetermined position in a wrist of the robot to which an operation tool is attached or in the operation tool attached to the robot,
the input unit has an image operation part by which an operator operates the image on the display unit,
the display control unit changes the image so that a direction of one of the jog coordinate system and the robot is fixed while a direction of the other changes continuously in accordance with an operation of the operator in the image operation part, and
when the operator operates the robot operation part, the manual control unit changes the position and orientation of the robot based on a direction of the coordinate axis of the jog coordinate system with respect to the robot in the image.

2. The robot control device according to claim 1, comprising:
a storage unit for storing a direction of the jog coordinate system with respect to the robot, which has been changed by the operation of the image operation part, wherein
the display control unit acquires the direction of the jog coordinate system with respect to the robot, which has been stored in the storage unit, and displays the image.

3. The robot control device according to claim 1, wherein the display control unit displays the image of the robot, which is viewed from a view point which is rotated about a predetermined point serving as a center by the operation of the operator.

* * * * *